United States Patent

Lin et al.

[11] Patent Number: 6,148,988
[45] Date of Patent: Nov. 21, 2000

[54] AUTOMATIC PALLET CHANGER

[75] Inventors: Wei-Jun Lin, Taichung Hsien; Hsiang-Feng Huang; Kuan-Wen Chen, both of Taichung, all of Taiwan

[73] Assignee: Industrial Technology Research Institute, Taiwan

[21] Appl. No.: 09/229,675

[22] Filed: Jan. 13, 1999

[30] Foreign Application Priority Data

Nov. 4, 1998 [TW] Taiwan .................................. 87218274

[51] Int. Cl.⁷ .................................................. B65G 29/00
[52] U.S. Cl. ................. 198/346.1; 198/414; 414/222.07; 414/222.09; 414/222.12
[58] Field of Search ................................ 198/346.1, 414; 414/222.07, 222.09, 222.12; 29/33 P

[56] References Cited

U.S. PATENT DOCUMENTS

| | | | |
|---|---|---|---|
| 4,794,686 | 1/1989 | Moore | 29/33 P |
| 5,261,147 | 11/1993 | Wood, III | 29/33 P |
| 5,992,608 | 12/1996 | Ahn | 198/346.1 |

FOREIGN PATENT DOCUMENTS

| | | | |
|---|---|---|---|
| 1590-409 | 9/1990 | U.S.S.R. | 198/414 |

Primary Examiner—Christopher P. Ellis
Assistant Examiner—Mark A. Deuble
Attorney, Agent, or Firm—Smith, Gambrell & Russell, LLP

[57] ABSTRACT

An automatic pallet changer is composed of a pallet lifting mechanism and a revolving mechanism. The pallet lifting mechanism has a pallet platform and a lifting rod which is fastened with the bottom of the pallet platform. The pallet platform and the lifting rod are driven by oil pressure to move up and down in a linear manner. The body of the lifting rod is provided with a vertically-oriented first position confining portion. The revolving mechanism has a gear and a rack gear member. The gear is pivoted to the bottom of the pallet lifting mechanism at a fixed height and provided axially with a slide channel in which the lifting rod is slidably disposed. The slide channel is provided in the inside thereof with a vertically-oriented second position confining portion, which is complementary in shape to the first position confining portion of the lifting rod for enabling the lifting rod and the pallet platform to turn synchronously. The rack gear member is engaged with the gear so as to drive the gear to rotate.

6 Claims, 5 Drawing Sheets

AUTOMATIC PALLET CHANGER

FIELD OF THE INVENTION

The present invention relates generally to an automatic manufacturing system, and more particularly to an automatic pallet changer for performing a workpiece changing operation.

BACKGROUND OF THE INVENTION

The automatic pallet changer (APC) is used in the automatic manufacturing system and is mainly composed of two pallets which are interchangeable in position. Each of the two pallets is provided thereon with a workpiece such that the workpiece on one of the pallets is located in the manufacturing and finishing position, and that the workpiece on the other one of the pallets is involved in a pallet changing operation, thereby resulting in the reduction in the waiting time of conventional operations in which the workpieces are loaded on the machine or unloaded from the machine As shown in FIG. 1, a conventional APC is formed of a pallet lifting mechanism 1 and a revolving mechanism 2. When a pallet 5 is raised by the pallet lifting mechanism 1, the pallet 5 is subsequently changed and rotated by the revolving motion brought about by the revolving mechanism 2. Upon completion of the changing operation, the pallet 5 is lowered and then located by the lifting mechanism 1. The revolving mechanism 2 has a gear 3, which is actuated to move up and down along with the lifting mechanism 1. In order to make sure that the moving range of the gear 3 is so coordinated that the gear 3 meshes well with a rack gear member 4 of the revolving mechanism 2, the gear 3 is thicker and greater in volume. As a result, the gear 3 takes up a relatively large space. In light of the wear brought about by the constant friction between the gear 3 and the rack gear member 4, the gear gap tends to so enlarge that operational precision is seriously undermined. Moreover, the pallet 5 is initially located by means of the gear 3 and the rack gear member 4 and is finally located by the locating portion 6 which is located under the pallet 5. The enlargement of the gear gap can undermine the precision with which the pallet is initially located by the gear body.

SUMMARY OF THE INVENTION

It is therefore the primary objective of the present invention to provide an automatic pallet changer which is compact and yet applicable to a palletizing mechanism of large-scale dimension.

It is another objective of the present invention to provide an automatic pallet changer free from the pallet locating problem, which results from the gear gap.

It is still another objective of the present invention to provide an automatic pallet changer free from the problem of wear of the gear and the rack gear member, which is due to the constant vertical sliding motions of the gear and the rack gear member.

The automatic pallet changer of the present invention is composed of a pallet-lifting mechanism and a revolving mechanism. The pallet-lifting mechanism has a pallet platform and a lifting rod which is fastened with the bottom of the pallet platform. The pallet platform and the lifting rod are driven by oil pressure to move up and down and linearly. The body of the lifting rod is provided vertically with a first position confining portion. The revolving mechanism has a gear and a rack gear member. The gear is pivoted at the bottom of the pallet lifting mechanism at a fixed height and is provided at the axis thereof with a slide channel in which the lifting rod is slidably disposed. The slide channel is provided in the vertical direction of the inside thereof with a second position confining portion, which is complementary in shape to the first position confining portion of the lifting rod for enabling the lifting rod and the pallet platform to turn synchronously. The rack gear member is engaged with the gear to drive the gear to rotate.

The foregoing objectives, features and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
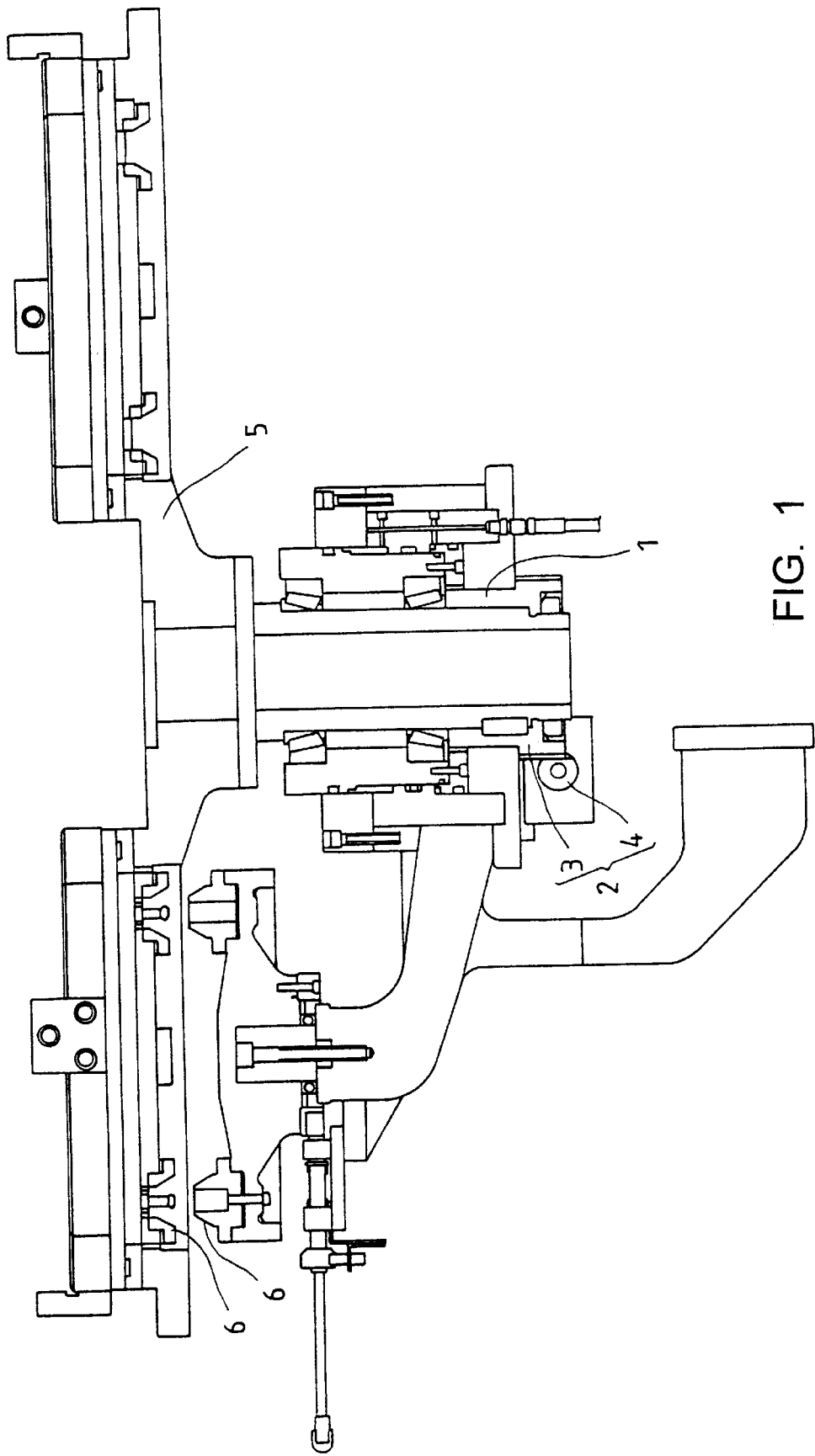
FIG. 1 shows a schematic view of an automatic pallet changer of the prior art.
Figure 2:
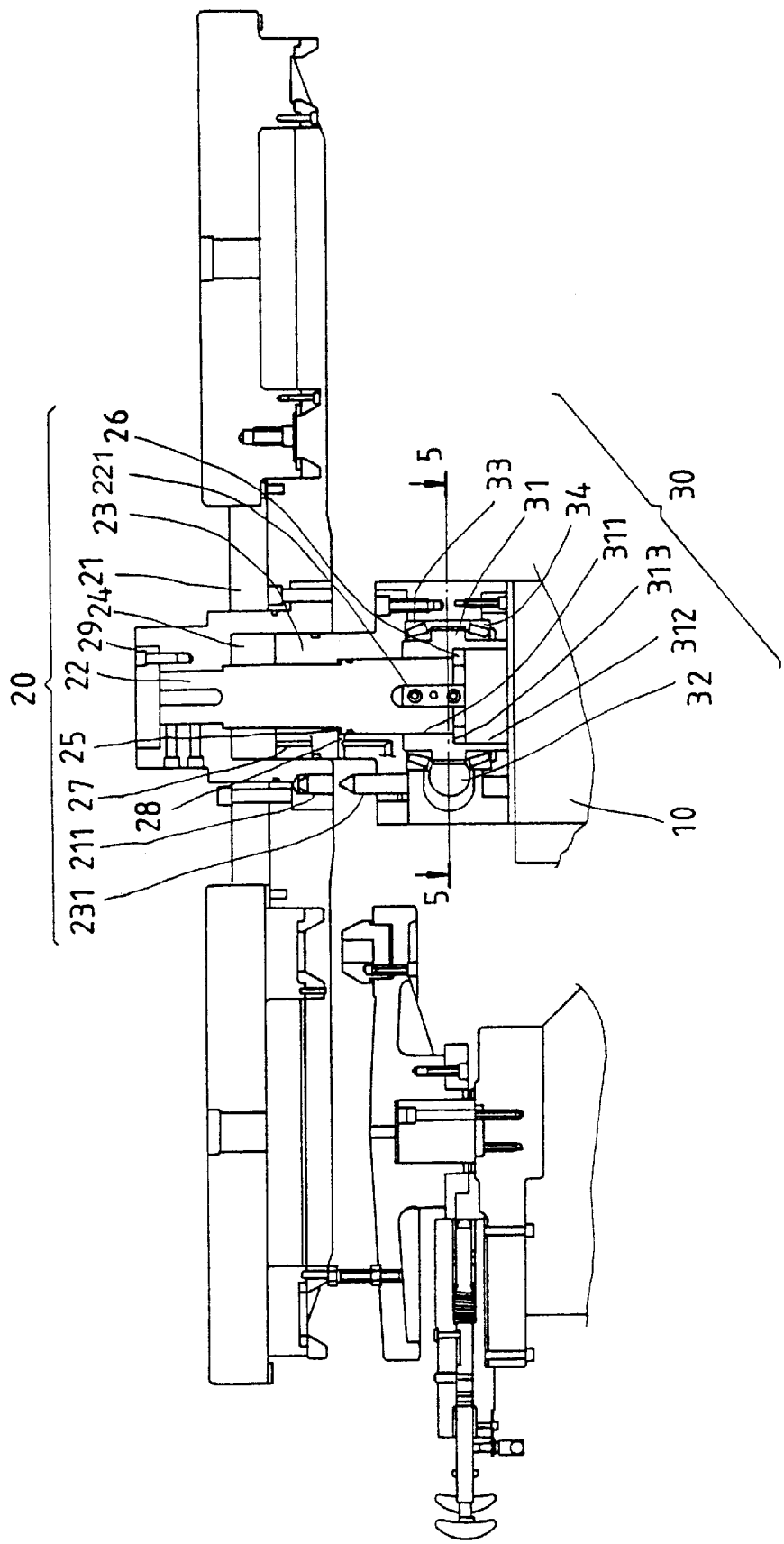
FIG. 2 shows a sectional view of the preferred embodiment of the present invention.
Figure 3:
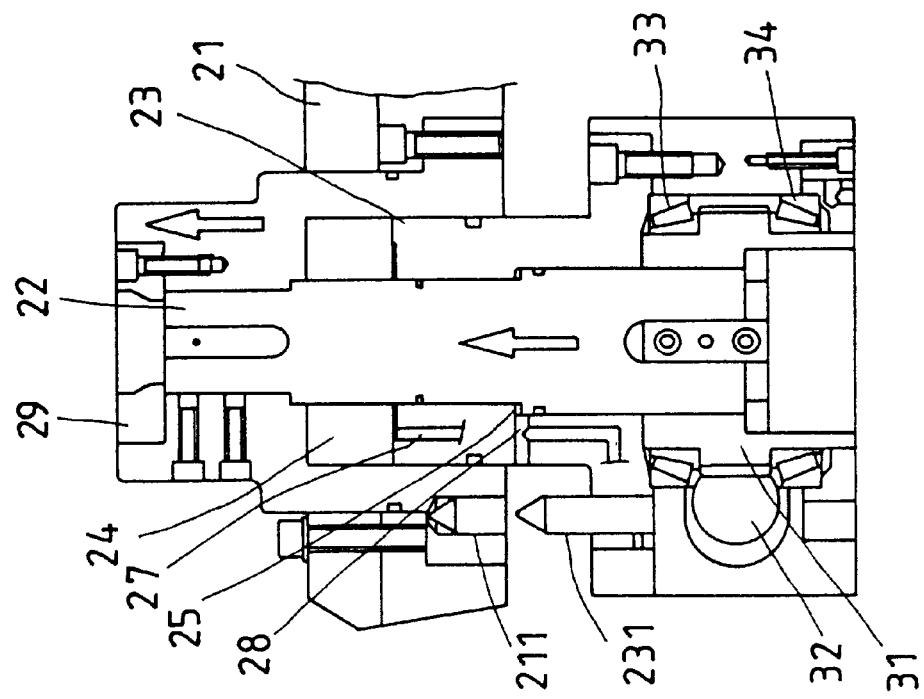
FIG. 3 is a sectional view of the present invention to show the lifting mechanism of the present invention located at the ascending position.
Figure 4:
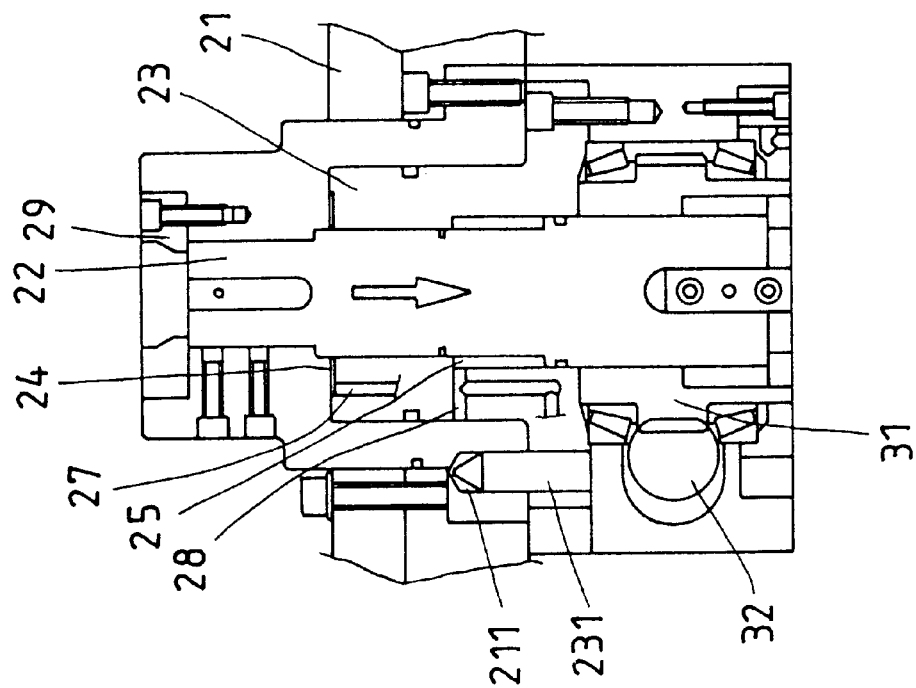
FIG. 4 is a sectional view of the present invention to show the lifting mechanism of the present invention located at the descending position.
Figure 5:
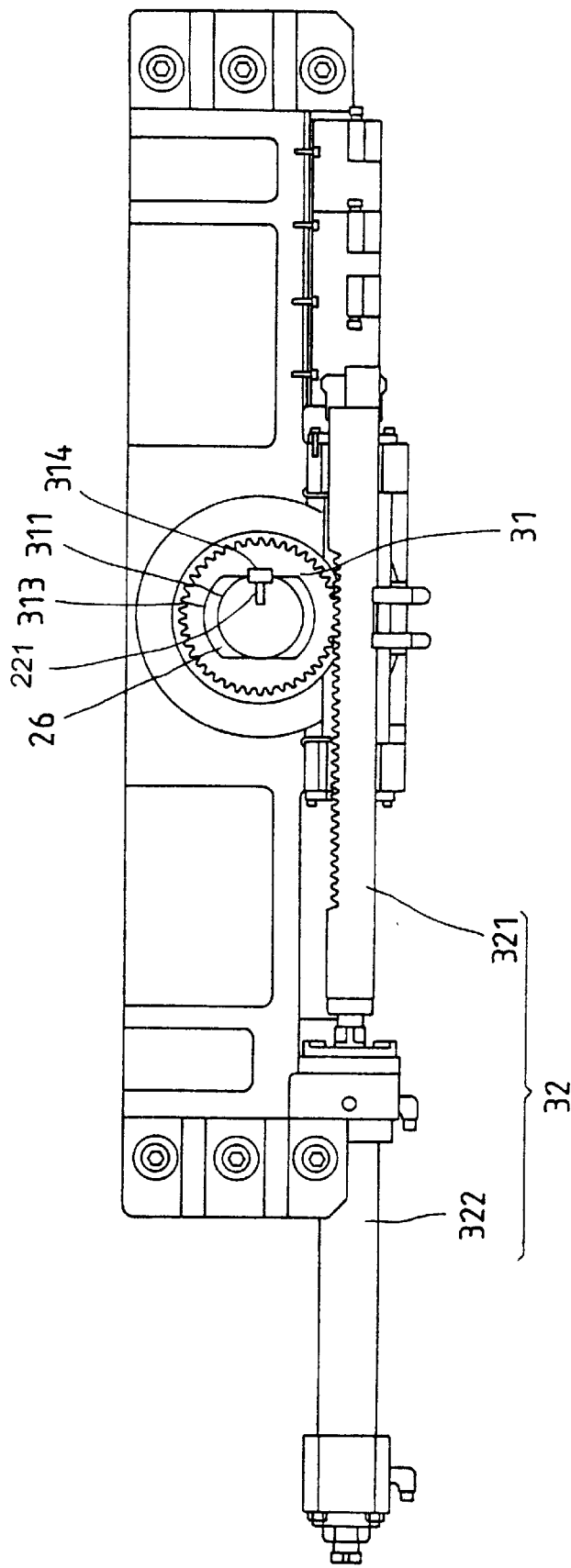
FIG. 5 is a sectional view taken along the direction indicated by a line 5—5 as shown in FIG. 2 for showing that the lifting rod is disposed in the slide channel of the gear.

As shown in FIG. 2, an automatic pallet changer (APC) embodied in the present invention has a stand 10, which is provided with a pallet lifting mechanism 20 and a revolving mechanism 30.

Figure 6:
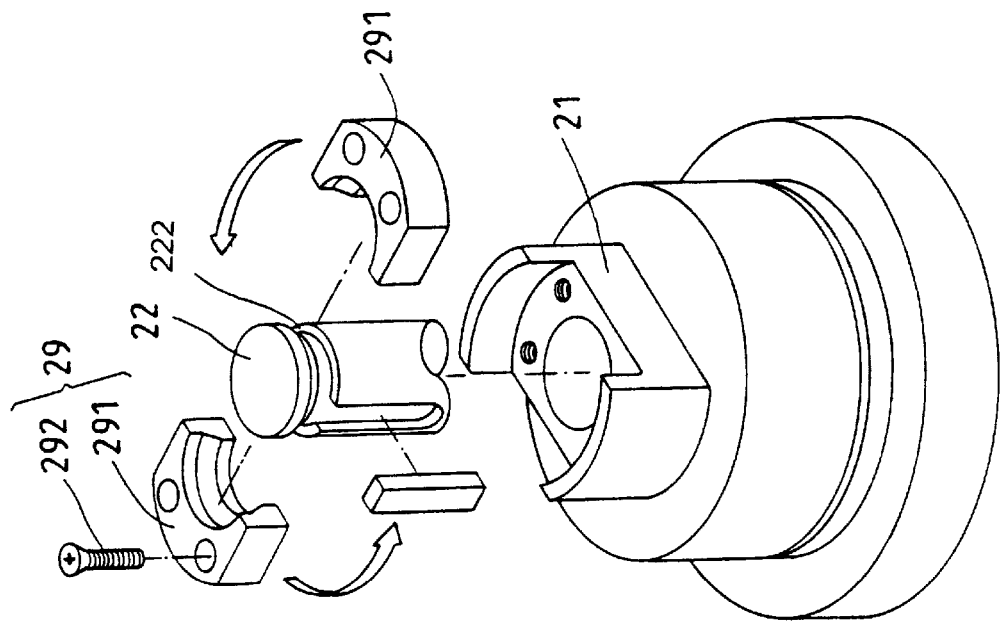
FIG. 6 shows an exploded view of a locking device of the present invention.
Figure 7:
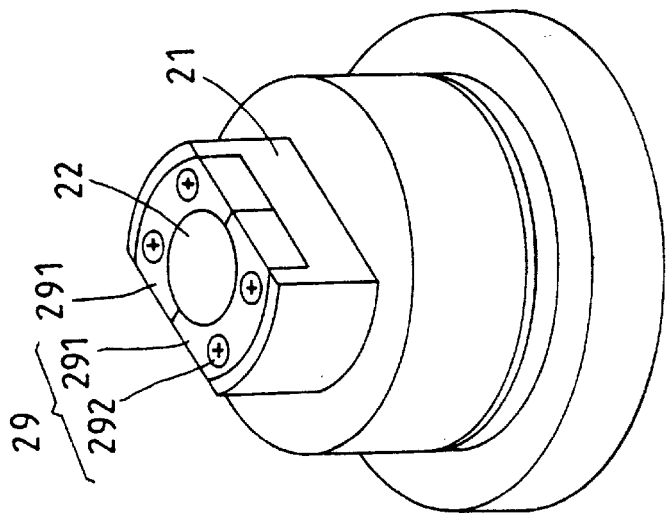
FIG. 7 shows a perspective view of the locking device of the present invention in combination.

The pallet lifting mechanism 20 is mounted on the top of the stand 10 and composed of a pallet platform 21, a lifting rod 22, and a fastening seat 23. The pallet platform 21 is intended to receive a workpiece and is provided with a locating hole 211. The lifting rod 22 is fastened under the pallet platform 21 by a locking device 29, which is shown in FIGS. 6 and 7. The lifting rod 22 is provided in the periphery of the top end thereof with a recessed inner tapered surface 222 which is fitted into two inclined tapered tightening rings 291 and is fastened on the pallet platform 21 by a fastening screw 292 such that the lifting rod 22 and the pallet platform 21 are kept in the self-locking state, and that the pulling internal force is brought about by the pressing action of the tapered surface, thereby enhancing the rigidity of the entire body. The pallet platform 21 is provided in the bottom thereof with a vertically-oriented first position confining portion 221 of a rectangular key construction. The lifting rod 22 is provided at the tail end thereof with an urging plate 26 having an outer diameter greater than the lifting rod 22. The fastening seat 23 is mounted on the stand 10 such that the top of the fastening seat 23 forms a first oil chamber 24 along with the pallet platform 21 and the lifting rod 22, and that the midsection of the fastening seat 23 forms a second oil chamber 25 along with the lifting rod 22. The first oil chamber 24 and the second oil chamber 25 are in communication with each other by a first oil channel 27 and a second oil channel 28. The fastening seat 23 is provided in the outerside thereof with a locating pin 231 having a tapered end and corresponding to the locating hole 211.

The revolving mechanism 30 is mounted in the stand 10 and located at the bottom of the pallet lifting mechanism 20. The revolving mechanism 30 has a gear 31 and a rack gear member 32. The gear 31 is pivoted at a fixed height with the bottom of the lifting mechanism 20. The gear 31 is provided at the upper end thereof and the lower end thereof with a bevel roller bearing 33 which has a high axial strength and is pivoted at a fixed height in the interior of the stand 10. The gear 31 is axially provided with a slide channel 311 having a smaller hole diameter, and a receiving slot 312 having a larger hole diameter. The gear 31 is provided at the top head thereof with a stop surface 313. The slide channel 311 is provided in the periphery thereof with a vertically-oriented second position confining portion 314 which takes the form of a rectangular key slot and is complementary in shape to the first position confining portion 221. The first position confining portion 221 of the lifting rod 22 is fitted into the second position confining portion 314 of the gear 31 such that the up-and-down sliding motion of the gear 31 is confined by the lifting rod 22, and that the lifting rod 22 is capable of the up-and-down linear motion at the time when the oil pressure operation is under way. In the meantime, the lifting rod 22 and the gear 31 are capable of turning synchronously at the time when the revolving operation is under way. When the lifting rod 22 has risen to a predetermined height, the urging plate 26 urges the stop surface 313. The rack gear member 32 has a rack gear 321 and an oil pressure cylinder 322 which is provided with a piston rod. The rack gear 321 is connected with the piston rod such that the rack gear 321 is driven by the oil pressure cylinder 322 in operation to move linearly. The rack gear 321 meshes with the gear 31 to drive the gear 31 to turn, thereby resulting in the revolving and changing operation of the pallet platform 22.

The action flow of the present invention is described hereinafter.

1. Ascending Operation of Pallet Platform 21

The oil is injected into the first oil chamber 24 of the pallet lifting mechanism 20, whereas the oil in the second oil chamber 25 is discharged. As a result, the pallet platform 21 and the lifting rod 22 are lifted synchronously. In light of the gear 31 being located at a fixed height, the lifting rod 22 rises linearly along a path which is confined by the first and the second position confining portions 221 and 314. In the meantime, the locating pin 231 moves away from the locating hole 211 to remain in the nonlocating state.

2. Revolving And Changing Operation of Pallet Platform 21

By virtue of the action of the oil pressure cylinder 322, the rack gear 321 is actuated by the rack gear member 32 such that the gear 31 is actuated to turn. In light of the design of the first and the second position confining portions 221 and 314, the lifting rod 22 and the pallet platform 21 are actuated to bring about a 180-degree revolving and changing operation.

3. Descending And Locating Operation Of Pallet Platform 21

The oil in the first oil chamber 24 of the pallet lifting mechanism 20 is discharged, whereas the oil is injected into the second oil chamber 25. As a result, the pallet platform 21 and the lifting rod 22 descend to locate synchronously. In the meantime, the locating pin 231 moves into the locating hole 211 to bring about the initial locating effect so as to prevent the tooth gap from becoming bigger to undermine the precision of the locating process.

In terms of the structural members described above, the present invention has the function of the original pallet changing operation. In addition, the present invention is free from the drawback of the prior art that the gear engagement must be taken into consideration as the gear and the lifting rod ascend and descend synchronously. As a result, the thickness of the gear of the present invention is reduced to an extent that the space taken up by the gear is minimized. Moreover, the gear and the lifting rod of the present invention are not vulnerable to friction and wear which are caused by the vertical sliding motions of the gear and the lifting rod. The enlargement of the tooth gap is thus averted, so as to ensure that the present invention always operates with precision. The present invention has a high-precision locating effect, thanks to the locating pin 231 and the locating hole 211.

The embodiment of the present invention described above is to be deemed in all respects as being merely illustrative and not restrictive. Accordingly, the present invention may be embodied in other specific forms without deviating from the spirit thereof. For example, the way that the oil chambers of the present invention are connected and the way that the pallet platform and the lifting rod of the present invention are connected may depend on various designs of space structure or various arrangements of oil tubes. The present invention is therefore to be limited only by the scope of the following appended claims.

What is claimed is:

1. An automatic pallet changer, comprising:

a pallet lifting mechanism having a pallet platform and a lifting rod fastened with a bottom of said pallet platform such that said lifting rod can be actuated along with said pallet platform to ascend or descend linearly by means of oil pressure, said lifting rod having a body which is provided with a vertically-oriented first position confining portion, and wherein said lifting rod is provided at one end thereof with an urging plate fastened therewith, said urging plate having an outer diameter greater than an outer diameter of said lifting rod; and a revolving mechanism having a gear and a rack gear member, said gear being pivoted to a bottom of said pallet lifting mechanism at a fixed height and provided axially with a slide channel for locating slidably said lifting rod, said slide channel provided in an inner side thereof with a vertically-oriented second position confining portion complementary in shape to said first position confining portion for enabling said lifting rod and said pallet platform to turn synchronously, wherein said slide channel of said gear is provided in a bottom end thereof with a receiving slot greater than a hole diameter of said slide channel, said slide channel further provided at a top thereof with a stop surface which is urged by said urging plate at such time when said lifting rod is raised, and wherein said rack gear member is engaged with said gear so as to drive said gear to turn.

2. The automatic pallet changer as defined in claim 1, wherein said first position confining portion of said lifting rod takes a form of a rectangular position confining key; and wherein said second position confining portion of said gear takes a form of a rectangular key slot.

3. The automatic pallet changer as defined in claim 1, wherein said gear is pivoted at an upper end thereof and a lower end thereof in a stand by a bevel roller bearing.

4. An automatic pallet changer, comprising:

a pallet lifting mechanism having a pallet platform and a lifting rod fastened with a bottom of said pallet platform such that said lifting rod can be actuated along with said pallet platform to ascend or descend linearly by means of oil pressure, said lifting rod having a body which is provided with a vertically-oriented first position confining portion;

a revolving mechanism having a gear and a rack gear member, said gear being pivoted to a bottom of said pallet lifting mechanism at a fixed height and provided axially with a slide channel for locating slidably said lifting rod, wherein said gear is pivoted at an upper end thereof and a lower end thereof in a stand by a bevel roller bearing, wherein said slide channel is provided in an inner side thereof with a vertically-oriented second position confining portion complementary in shape to said first position confining portion for enabling said lifting rod and said pallet platform to turn synchronously, said rack gear member being engaged with said gear so as to drive said gear to turn; and a fastening seat mounted on said stand such that a top of said fastening seat, said pallet platform, and said lifting rod form together a first oil chamber, and that a midsection of said fastening seat and said lifting rod form together a second oil chamber; and wherein said pallet lifting mechanism is actuated to engage in a linear motion by injection of oil into and discharge of oil from said first oil chamber and said second oil chamber.

5. The automatic pallet changer as defined in claim 1, wherein said pallet platform is provided with a locating hole; and wherein said fastening seat is provided with a locating pin having a tapered top end and corresponding to said locating hole.

6. An automatic pallet changer, comprising:

a pallet lifting mechanism having a pallet platform and a lifting rod fastened with a bottom of said pallet platform such that said lifting rod can be actuated along with said pallet platform to ascend or descend linearly by means of oil pressure, said lifting rod having a body which is provided with a vertically-oriented first position confining portion, wherein said lifting rod is fastened with a top of said pallet platform by a locking device, said lifting rod is provided in a periphery of a top end thereof with a recessed inner tapered surface which is fitted into two included tapered fastening rings and fastened with said pallet platform by fastening screws; and a revolving mechanism having a gear and a rack gear member, said gear being pivoted to a bottom of said pallet lifting mechanism at a fixed height and provided axially with a slide channel for locating slidably said lifting rod, said slide channel provided in an inner side thereof with a vertically-oriented second position confining portion complementary in shape to said first position confining portion for enabling said lifting rod and said pallet platform to turn synchronously, said rack gear member being engaged with said gear so as to drive said gear to turn.

* * * * *